May 28, 1968 G. RESTALL 3,385,388
POWER COUPLINGS
Filed March 16, 1966 3 Sheets-Sheet 1
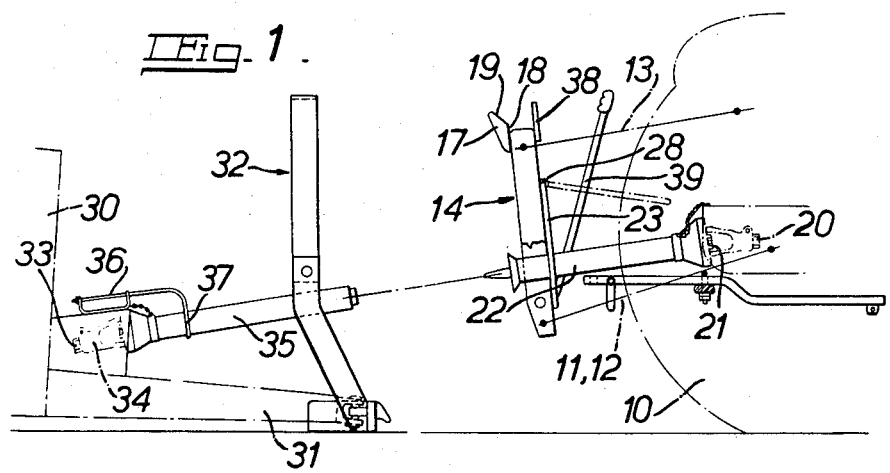
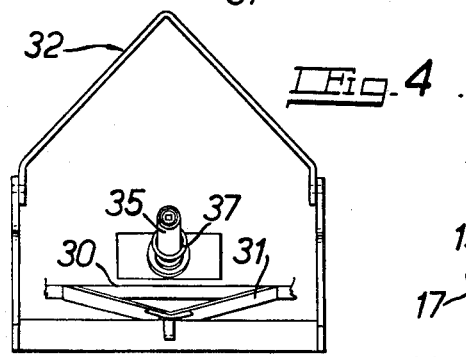
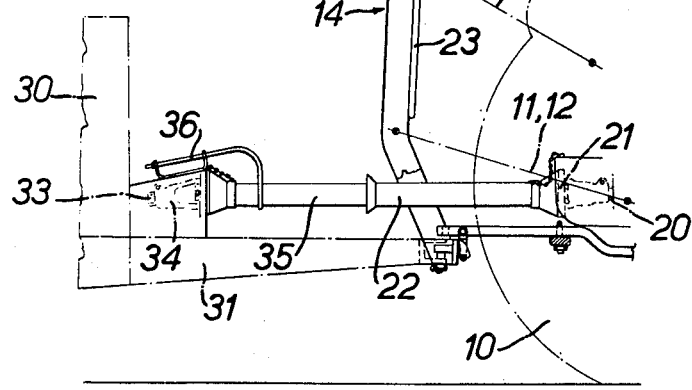

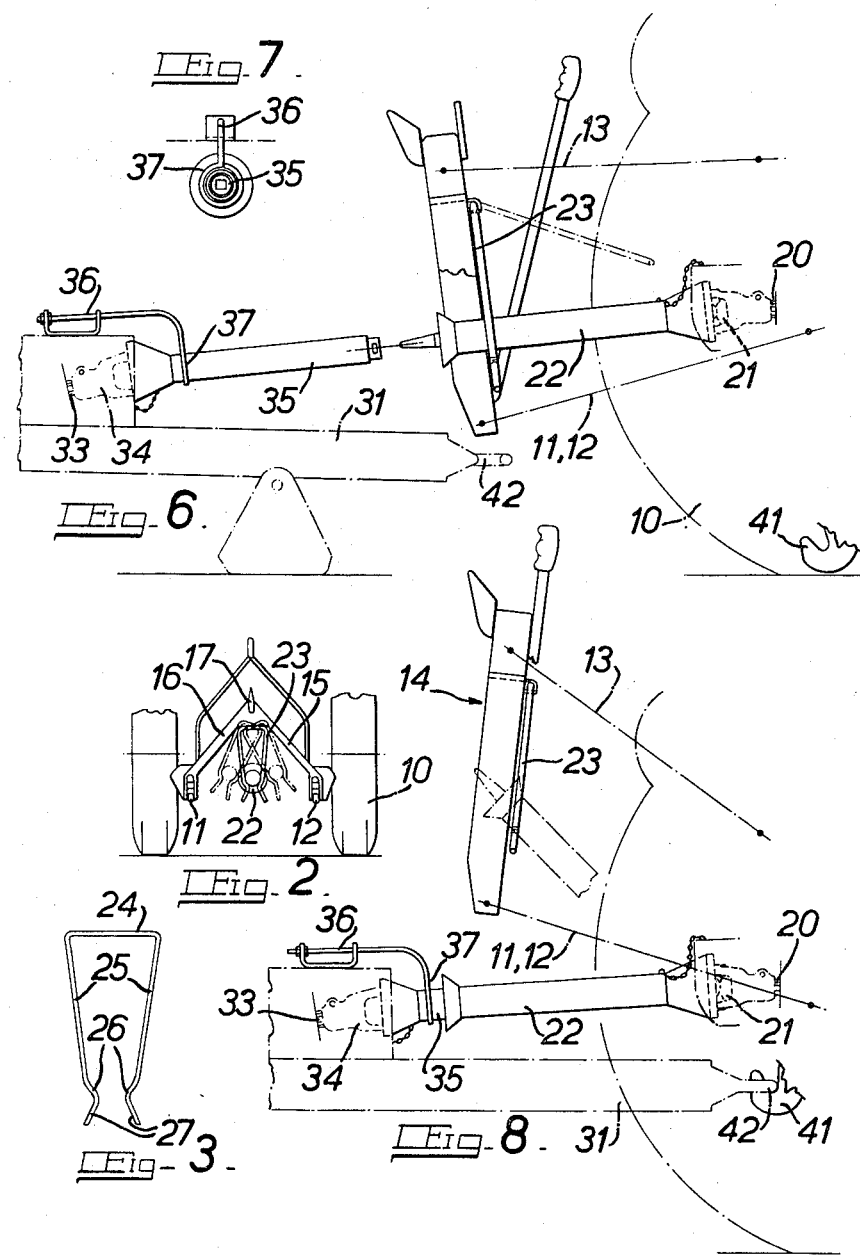

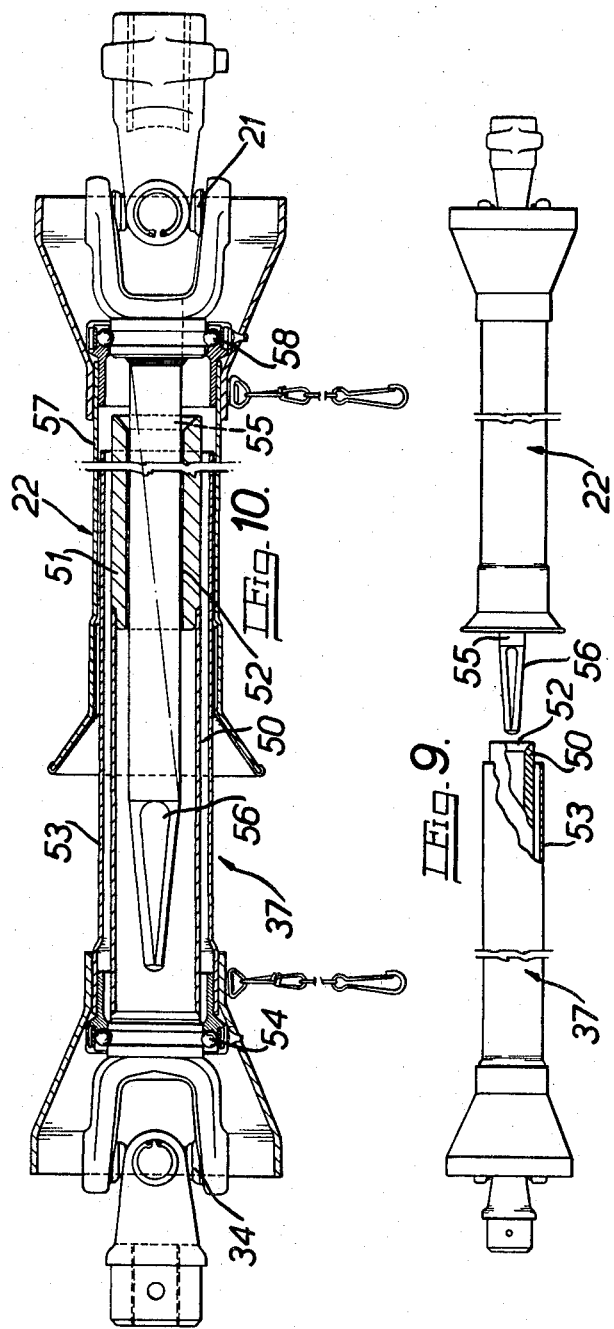

United States Patent Office 3,385,388
Patented May 28, 1968

3,385,388
POWER COUPLINGS
George Restall, Sutton Coldfield, England, assignor to Rubery, Owen and Company Limited, Wednesbury, England
Filed Mar. 16, 1966, Ser. No. 534,848
Claims priority, application Great Britain, Mar. 16, 1965, 11,094/65, 11,096/65
10 Claims. (Cl. 180—14)

ABSTRACT OF THE DISCLOSURE

In a power coupling for transmitting power from a power take-off shaft of a tractor to a power drive shaft of an implement a shaft assembly connected to the power take-off shaft is supported by resilient means, such as an inverted U-shaped spring clip, from a frame mounted on the tractor, and the resilient means is movable out of engagement with the shaft assembly when it is in slidable coupling engagement with a complementary shaft assembly connected to the power drive shaft of the tractor and the frame is moved relative to the coupled shaft assemblies.

---

This invention relates to means for hitching or coupling a tractor provided with a power take-off shaft, and to means for coupling for power transmission the power take-off shaft and the power drive shaft. More particularly the present invention is concerned with a power coupling of the kind comprising a first shaft assembly adapted to be connected to the power take-off shaft of the tractor through a first universal joint, a second shaft assembly for slidable coupling engagement with the first shaft-assembly and adapted to be connected to the power drive of the implement through a second universal joint, and means for maintaining both shaft assemblies in substantial alignment prior to their engagement in which at least one of the shaft assemblies is suspended by resilient means from the tractor or implement or a member carried by the tractor or implement.

According to our present invention, in a power coupling of the kind set forth the shaft assembly connected to the power take-off shaft of the tractor is supported by resilient suspension means from a frame mounted on the tractor whereby movement of the frame under the control of power means on the tractor causes the shaft assembly to be raised or lowered, and the shaft assembly is releasable automatically from the resilient suspension means upon raising the frame when the shaft assembly is engaged with the co-operating shaft assembly connected to the power drive shaft of the implement so permitting unrestrained movements of the shaft assembly.

By lowering the tractor frame the resilient suspension means automatically engage with the shaft assembly so that it is again supported.

Preferably movements of the frame also control automatically engagement or coupling of co-operating hitching means between the tractor and implement so that by raising the tractor frame, besides releasing the shaft assembly from the resilient suspension means, the hitching means can be engaged substantially simultaneously. Conversely lowering of the frame with engagement of the suspension means with the shaft assembly may be accompanied with substantially simultaneous disengagement of the hitching means.

In one form the resilient suspension means comprises an inverted U-shaped clip of spring steel depending downwardly from the frame on the tractor. The limbs of the clip at intermediate points in their lengths are bent towards each other to provide opposed portions which support the shaft assembly and which are adapted to be sprung apart to release the shaft assembly when the frame is moved in an upward direction relative to the shaft assembly. At the opposed portions the limbs are bent away from each other and diverse towards their free ends.

Two embodiments showing co-operating parts of hitching means and a power coupling for a tractor and an implement in accordance with our invention are illustrated by way of example in the accompanying drawings in which:

FIGURE 1 is a side elevation showing the rear end of a tractor and the forward end of an implement before engagement or coupling of the power coupling and the hitching means;

FIGURE 2 is a rear end view of the tractor shown in FIGURE 1;

FIGURE 3 is a view on an enlarged scale of the clip shown in FIGURES 1 and 2;

FIGURE 4 is a front end view of the implement shown in FIGURE 1;

FIGURE 5 is a view similar to FIGURE 1 showing the power coupling and the hitching means engaged or coupled;

FIGURE 6 is a side elevation showing in a second form the rear end of a tractor and the forward end of an implement before engagement or coupling of the power coupling and the hitching means;

FIGURE 7 is a rear end view showing the suspension of the implement shaft assembly shown in FIGURE 6;

FIGURE 8 is a view similar to FIGURE 6 showing the power coupling and the hitching means engaged or coupled;

FIGURE 9 is a view on an enlarged scale of the two shaft assemblies of the power coupling before engagement; and FIGURE 10 is a longitudinal section of the two shaft assemblies illustrated in FIGURE 9 in the engaged position.

In the arrangement shown in FIGURES 1 to 5, 10 is a tractor having a power-operated three point linkage comprising two rearwardly extending draft links 11, 12 shown in chain dotted lines, which lie in substantially the same horizontal plane and which can be raised and lowered by power means on the tractor, and an upper link 13, also shown by a chain dotted line centrally disposed above the draft links and adjustable in length. A hitch frame 14 of substantially inverted U or V outline is pivotally attached at or adjacent to the free ends of its limbs 15, 16 to the draft links. The limbs comprise opposed side members which converge upwardly and at their upper ends the limbs converge into an apex where the frame is pivotally connected to the outer end of the upper link 13 whose length is adjusted so that the hitch frame is maintained in a substantially vertical plane.

Integral with or welded to the outer face of the tractor hitch frame at its apex there is an upwardly extending hook member 17 which projects rearwardly from the frame. The hook has an upwardly extending vertical edge 18 adjacent to the apex of the frame and a rearwardly inclined edge 19 leading from the vertical edge 18, and extending to the top of the hook.

The tractor has a rearwardly extending power take-off shaft 20 to which is connected through a universal joint 21 a shaft assembly 22.

An inverted U shaped spring steel clip 23 of circular or rectangular section which may be coated with plastic to form a protective covering depends downwardly from the tractor hitch frame. As shown in FIGURE 3 the spring clip is formed with a substantially straight top portion 24 from opposite ends of which depend downwardly extending limbs 25 which converge for substantially twothirds of their lengths where the limbs are bent towards each other to form opposed shoulder portions 26. At the shoulder portions the limbs are bent away from each other to form diverging portions 27 which terminate at the free ends of the limbs. At substantially the mid-point in the top portion 24 the clip is pivotally mounted on a pivotal connection 28 at the apex of the hitch frame positioned such that the outer face of the clip lies substantially in alignment with the rear face of the hitch frame.

Normally the shaft assembly 22 is gripped between the limbs of the clip 23 and rests on the shoulder portion 26 so that when the tractor hitch frame is moved in up and down directions by operation of the power operated three point linkage, the shaft assembly is moved angularly about its universal joint in corresponding directions. Furthermore the pivotal connection permits the shaft assembly 22 to move in a substantially transverse arc relative to the hitch frame 14 as shown in chain-dotted lines in FIGURE 2.

An implement 30 to be hitched or coupled to the tractor has mounted on the outer end of a draw-bar 31 a substantially vertical hitch frame 32 of substantially U or V outline which is of a shape complementary to that of the tractor hitch frame 14 with which it is to cooperate when the tractor and implement are hitched or coupled together. The implement above its draw-bar 31 has a forwardly extending power drive shaft 33 to which is connected through a universal joint 34 a shaft assembly 35. A plastic coated flexible steel rod 36 is fixed to the implement above the draw-bar and has a cranked outer end in which is formed a loop 37 in which the shaft assembly is received. The rod normally holds the shaft assembly 35 in substantial alignment with its power drive shaft 33 but is sufficiently flexible to permit angular movement of the shaft assembly about the universal joint 34 relative to the power drive shaft 33.

When the tractor and the implement are to be hitched or coupled together and the shaft assemblies 22 and 37 are to be coupled to enable power to be transmitted from the power take-off shaft 20 of the tractor to the power drive shaft 33 of the implement, the tractor is reversed up to the implement and the tractor hitch frame is lowered until adjacent ends of the shaft assemblies are in substantial alignment in a vertical plane. Should the shaft assemblies be slightly out of alignment in a transverse direction the tractor hitch frame 14 can be moved to one side by the driver of the tractor. The tractor is further reversed towards the implement until the shaft assemblies are fully engaged in which position the tractor hitch frame 14 is received within the implement hitch frame 32. By raising the tractor hitch frame 14 the resilient clip 23 is also raised relative to the engaged shaft assemblies to release the shaft assembly 22 so that the engaged shaft assemblies can move freely relative to the power take-off and power drive shafts when the tractor and implement are turning corners and/or travelling over uneven surfaces. Substantially simultaneously the hitch frames are fully engaged with the apex of the implement hitch frame 32 being received in a notch at the apex of the tractor frame 14 between the vertical edge 18 of the hook 17 and a vertically projecting plate 38 secured to the rear of the tractor hitch frame at its apex, the limbs of the hitch frames at or adjacent to their free ends being locked together by means which are engageable and releasable from the tractor seat by operation of an angularly movable lever 39. This feature forms the subject matter of my U.S. Patent No. 3,292,949.

To unhitch or uncouple the tractor and implement and to disconnect the shaft assemblies, the sequence of operations is the same as described above but takes place in reverse order and the divergence of the limbs of the clips 23 assist in guiding the shaft assembly 22 and the clip into engagement.

In FIGURES 6 to 8 there is illustrated a further embodiment of the invention applied to a tractor-implement combination where the hitching means are formed by means other than cooperating complementary hitch frames.

The arrangement of the shaft assemblies is substantially the same as described above with reference to FIGURES 1 to 5 and corresponding reference numerals have been used to indicate corresponding parts. However, in this arrangement a hook member 41 is pivotally mounted on the tractor under the differential casing of the axle (not shown), and the hook member is connected to the draft links 11, 12 of the tractor by tie members (not shown) so that the hook can be moved angularly between a lowered position shown in FIGURE 7, and a raised position shown in FIGURE 8.

The draw-bar on the implement at its outer end has a ring hitch member 42 with which the hook member on the tractor is adapted to be engaged for coupling or hitching the tractor and the implement.

When the tractor and the implement are to be hitched or coupled together and the shaft assemblies 22 and 37 are to be coupled, the tractor is reversed up to the implement and the draft links 11, 12 and hook member 41 are lowered until adjacent ends of the shaft assemblies are in substantial alignment. The tractor is further reversed towards the implement until the shaft assemblies are fully engaged. In this position the hitching operation is completed by raising the draft links which frees the tractor shaft assemblies 22 from the resilient clip 23 and at the same time moves the hook member 41 into engagement with the ring hitch member 42 on the implement.

To unhitch or uncouple the tractor and the implement and to disconnect the shaft assemblies, the sequence of operation is the same as described above but takes place in reverse order.

In this embodiment, for convenience, we have shown the resilient clip 23 depending from the apex of a frame similar to the tractor hitch frame illustrated in the embodiment of FIGURES 1 to 5. However, it is to be understood that in this embodiment where the frame from which the resilient clip depends plays no part in the hitching operations, any convenient kind of supporting frame may be utilised.

In both of the embodiments described above the pivotal connections 28 permits the resilient clip 23 to be swung forwardly towards the tractor into a position shown in chain-dotted lines so that parts of implements, such as ploughs, can pass through the tractor frames and are not impeded by the presence of the resilient clip.

The tractor and the implement shaft assemblies 22, 37 are shown in detail in FIGURES 9 and 10. The implement shaft assembly 37 comprises a hollow tube 50 which at its inner end is fixed to half of the universal joint 34 and which at its outer end is welded or otherwise secured to a tubular member 51 provided with a plain bore 52 of rectangular section. The outer end of the tubular member 51 projects by a short distance from an outer cylindrical shell 53 mounted on a bearing on the universal joint and enclosing the assembly.

The tractor shaft assembly comprises a shaft portion 55 of a section complementary to the section of the bore 52. The shaft portion at its outer end is fixed to half of the universal joint 21 and at its inner end it has a tapered nose portion 56 to facilitate sliding engagement of the shaft portion in the tubular member 51 when the shaft assemblies are engaged. The nose portion is formed by tapering down the shaft on each of its four sides. The nose portion of the shaft projects from an outer shell 57 enclosing the assembly and mounted on a bearing 58 on the universal joint. The diameter of the shell 57 is chosen so that it can receive the shell 53 when the shaft assemblies are engaged.

In one construction the shaft 55 and the bore 52 are of square cross-section thus providing four positions spaced angularly from each other by 90° in which the shaft can be engaged. In view of this the universal joints 21, 34 are of the constant velocity type in order to cancel out-of-phase characteristics.

In anther construction the shaft 55 and the bore 52 are of oblong rectangular cross-section so that there are only two positions spaced apart from each other by 180° in which the shaft and the bore can be engaged. This has the advantage that the universal joints 21, 34 can comprise Hooke's type universal joints provided that the universal joints are connected to shaft 55 and the tube 50 in angular positions in which the universal joints will be in phase when the shaft is received in the bore.

Engagement of the shaft assemblies for power transmission takes place substantially as described above. However, before the shaft assemblies are actually engaged it is necessary to ensure that the assemblies are in the correct angular alignment. After reversing the tractor up to the implement the shaft 55 is moved angularly by hand until a mark on the shaft is aligned with or within substantially 30° of a mark on the tubular member 51.

Should the ends of the shaft 55 and the member 51 not be in substantial alignment before they are engaged, the tractor shaft assembly can be moved manually to one side from the tractor seat to facilitate this engagement.

Although we have referred throughout the specification and claims to the term "tractor" and "implement" it is to be understood that these terms are to be construed as including any powered vehicle having a power takeoff shaft and any device, machine, vehicle or the like which is to be raised, lowered, towed or otherwise manoeuvred by the tractor and which is provided with a power drive shaft.

I claim:

1. In an automatic power coupling for a tractor having power means for raising and lowering a frame attached thereto and a power takeoff shaft, and an implement having a powerdrive shaft, the combination of: a first shaft assembly adapted to be connected to said power takoff shaft through a first universal joint, a second shaft assembly for slidable coupling engagement with said first shaft assembly and adapted to be connected to said powerdrive shaft through a second universal joint, resilient suspension means carried by said frame to support said first shaft assembly for movement in an up and down direction when the frame is raised and lowered, and an engagement between said resilient suspension means and said first shaft assembly to effect said up and down movement of said first shaft assembly with said frame, said engagement being constructed and arranged to automatically release said first shaft assembly from said resilient suspension means when said shaft assemblies are in slidable coupled engagement and the frame is moved relative thereto.

2. In an automatic power coupling for a tractor having power means for raising and lowering a frame attached thereto, hitching means and a power takeoff shaft, and an implement having hitching means for cooperation with the tractor hitching means and a power drive shaft, the combination of: a first shaft assembly adapted to be connected to said power takeoff shaft through a first universal joint, a second shaft assembly for slidable coupling engagement with said first shaft assembly and adapted to be connected to said powerdrive shaft through a second universal joint, resilient suspension means carried by said frame to support said first shaft assembly for movement in an up and down direction when the frame is raised and lowered, and an engagement between said resilient suspension means and said first shaft assembly to effect said up and down movement of said first shaft assembly with said frame, said engagement being constructed and arranged to automatically release said first shaft assembly from said resilient suspension means when said shaft assemblies are in slidable coupled engagement and the frame is raised relative thereto.

3. The combination as claimed in claim 2, where said resilient suspension means comprises an inverted generally U-shaped spring clip depending downwardly from the frame, said clip having opposed limbs between which said first shaft assembly is normally received and with which said first shaft assembly is movable in up and down direction with corresponding movement of said frame, said opposed limbs being normally urged towards each other to support the first shaft assembly, but being movable away from each other when the shaft assemblies are in slidable coupled engagement and the frame is raised relative to said coupled shaft assemblies.

4. The combination as claimed in claim 3, wherein said limbs at intermediate point in their lengths are bent towards each other to provide opposed portions which support the first shaft assembly, and the limbs are adapted to be sprung apart to release said shaft assembly when the frame is moved in an upward direction relative to it.

5. The combination as claimed in claim 3, wherein said limbs at intermediate point in their lengths are bent towards each other to provide opposed portions which support the first shaft assembly, and said opposed portions are bent away from each other and diverge towards their free ends.

6. The combination as claimed in claim 2, wherein said frame comprises a hitch frame adapter to engage with a complementary hitch frame mounted on the implement.

7. The combination as claimed in claim 2, wherein one shaft assembly has a plain bore of rectangular cross-section, and the other shaft assembly has a shaft part adapted to be slidably received within rectangular bore in said one shaft assembly when the shaft assemblies are moved relatively towards each other in an axial direction.

8. The combination as claimed in claim 7, wherein said shaft part has a tapered nose portion formed by tapering down the shaft part of each of its four sides.

9. The combination as claimed in claim 7, wherein said shaft part is of square cross-section.

10. The combination as claimed in claim 7, wherein said shaft part is of oblong rectangular cross-section.

References Cited

UNITED STATES PATENTS

| | | | |
|---|---|---|---|
| 2,869,660 | 1/1959 | Miller et al. | 180—14 |
| 3,007,535 | 11/1961 | Lippke | 180—14 |
| 3,074,501 | 1/1963 | Lane et al. | 180—14 |
| 3,299,979 | 1/1967 | Restall | 180—14 |

BENJAMIN HERSH, *Primary Examiner.*

C. C. PARSONS, J. SIEGAL, *Assistant Examiners.*